Feb. 9, 1926.
R. G. SCHULTZ ET AL
1,572,815
COMBINED LUGGAGE CARRIER AND BUMPER
Filed April 20, 1925   2 Sheets-Sheet 1
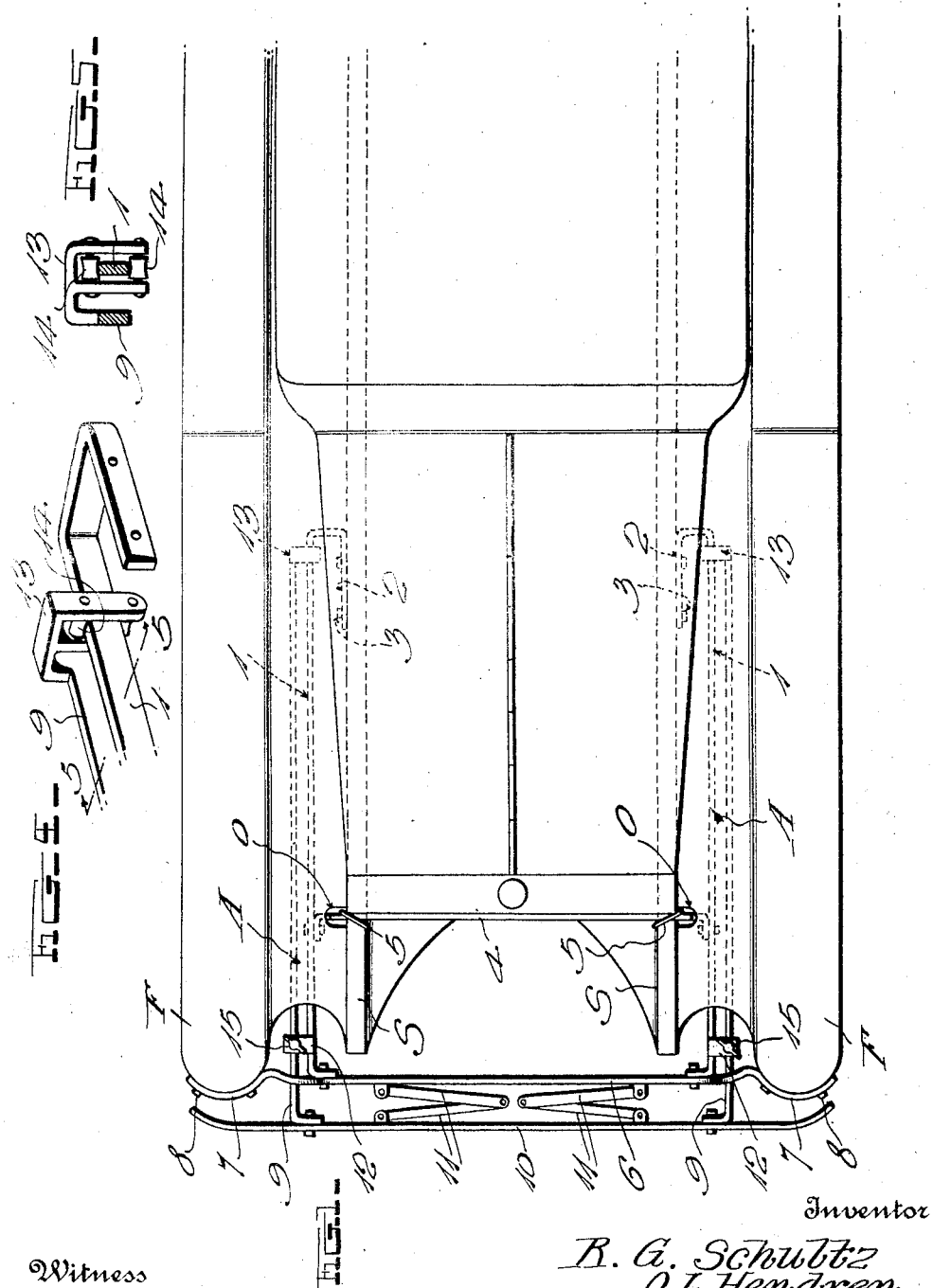
Witness
H. Woodard
Inventor
R. G. Schultz
O. L. Hendren
By H. B. Wilson & Co.
Attorneys

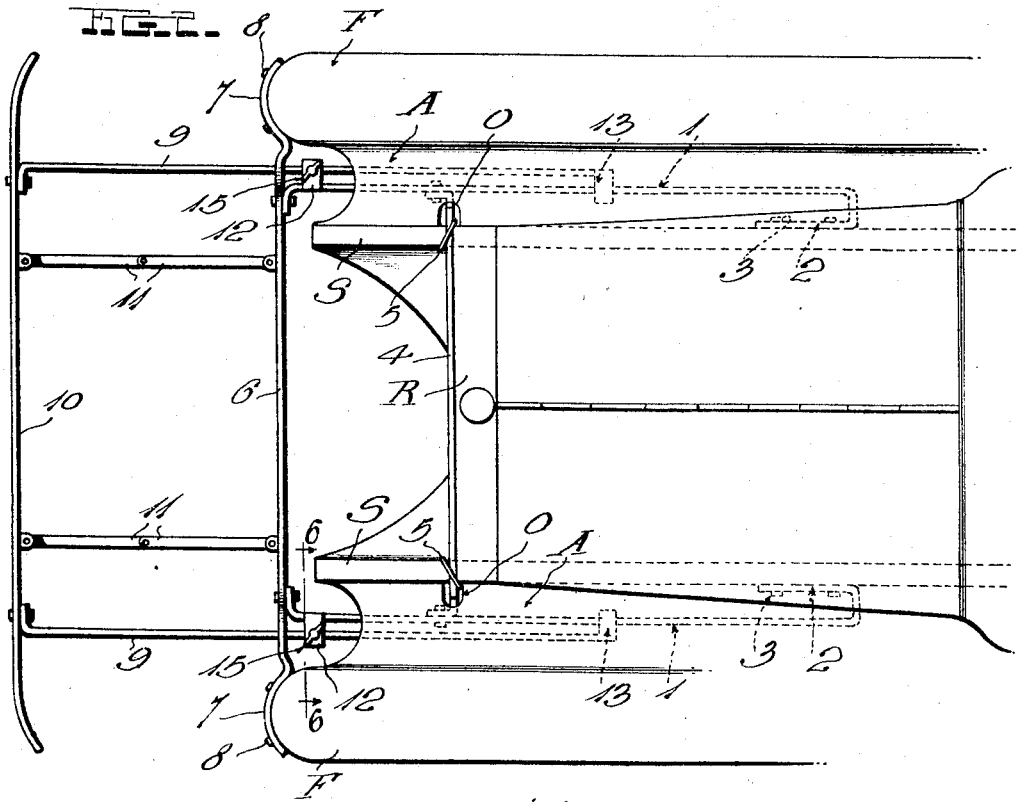
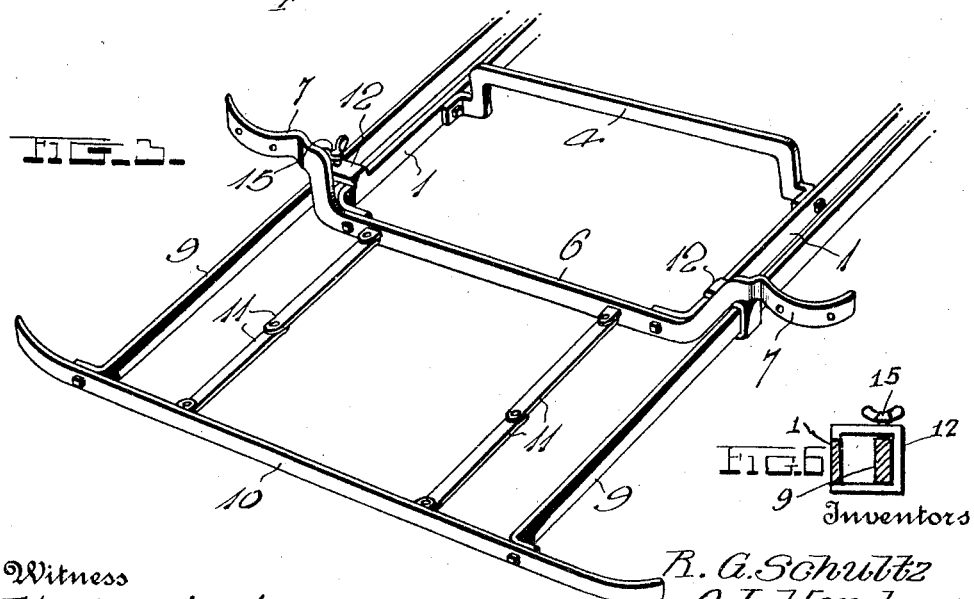

Patented Feb. 9, 1926.

1,572,815

UNITED STATES PATENT OFFICE.

RUDOLF G. SCHULTZ AND OTTO L. HENDREN, OF COLUMBUS, NEBRASKA; SAID SCHULTZ ASSIGNOR TO SAID HENDREN; MARY HENDREN ADMINISTRATRIX OF SAID OTTO L. HENDREN, DECEASED.

COMBINED LUGGAGE CARRIER AND BUMPER.

Application filed April 20, 1925. Serial No. 24,538.

*To all whom it may concern:*

Be it known that we, RUDOLF G. SCHULTZ and OTTO L. HENDREN, citizens of the United States, residing at Columbus, in the county of Platte and State of Nebraska, have invented certain new and useful Improvements in Combined Luggage Carriers and Bumpers; and we do declare the following to be a full, clear, and exact description of the invention, such as will enable others skilled in the art to which it appertains to make and use the same.

Our invention relates to automobile accessories and has reference in the present disclosure to bumpers, luggage carriers, and fender braces.

It is one object of the invention to provide a simple and inexpensive, yet an efficient and desirable attachment to constitute both a bumper and a luggage carrier, provision being made whereby said attachment may be extended when it is to be used as a luggage carrier and may be retracted when its use for this purpose is not necessary.

Another object of the invention is to provide an attachment of the class set forth which also constitutes a brace for two fenders of the machine on which it is used, so that even if any luggage on the carrier is piled against the ends of the fenders, the latter will not be bent or sprung.

With the foregoing in view, the invention resides in the novel subject matter hereinafter described and claimed, the description being supplemented by the accompanying drawings.

Figure 1 is a plan view showing the invention attached to an automobile and in a retracted position.

Figure 2 is a view similar to Fig. 1 but illustrating the device extended for use as a luggage carrier.

Figure 3 is a perspective view of the major portion of the attachment.

Figure 4 is a detail perspective view of a portion of the rear end of the attachment.

Figure 5 is a detail transverse sectional view on line 5—5 of Fig. 4.

Fig. 6 is a similar view on line 6—6 of Fig. 2.

In the drawings above briefly described, which illustrate one form of the invention, the numerals 1 designate a pair of parallel longitudinal bars intended to extend along the outer sides of the side bars S of an automobile chassis frame. We have shown the rear ends of the bars 1 bent inwardly and forwardly as indicated at 2 and secured to the chassis bars S by bolts 3, but it will be understood that other means of attachment could be used if desired. Near their front ends, the bars 1 are secured to the ends of a transverse bar 4 which may well pass through openings O formed in the aprons A of the front fenders F, any suitable means such as clips 5 being employed to secure said bar 4 to the chassis bars S. This bar 4 may extend in front of the radiator R as shown. The front ends of the side bars 1 are secured to a transverse bar 6 whose ends are suitably shaped at 7 for engagement with the front ends of the fenders F to which they may be connected by bolts or the like 8. While the extended ends of the bars 6 are preferably used to effectively brace the fenders F, in some instances, they might be omitted.

A second pair of parallel longitudinal bars 9 are slidably supported by the bars 1 and are connected at their front ends by a suitable transverse bumper bar 10. Between the bars 6 and 10 and connected therewith, we provide suitable extensible and contractible luggage-supporting means which may well be in the form of pivotally connected links 11 which permit the bumper bar 10 to be moved forwardly to the position of Figs. 2 and 3, or forced rearwardly as seen in Fig. 1. Thus, the device may be readily extended for use as a luggage carrier or retracted when its use for such purpose is not necessary.

The bars 9 are slidably supported by the bars 1 in any desired manner. In the construction shown, stirrups 12 are formed on the front ends of the bars 1, and the bars 9 pass slidably through said stirrups as shown in Fig. 6, while the rear ends of said bars are provided with additional stirrups 13 surrounding the bars 1. If desired, the stirrups 13 may be provided with suitable rollers 14 to permit more easy extension and retraction of the device, and in order to hold the bars 9 in any position to which they are adjusted, suitable means such as the set-screws 15, may be employed, said screws being arranged as shown in Figures 2 and 6 and being preferably formed with wings, permitting them to be easily turned by hand.

By providing the construction shown and described, or a substantial equivalent thereof, it will be seen that a simple, rather inexpensive and easily attached device has been provided, to serve as a bumper, as a luggage carrier when necessary, and in most instances as a brace for the fenders, so that if any luggage on the carrier rests upon said fenders, they will not be injured. The device is shown applied to the front end of an automobile, but it will be obvious that it might well be used on the rear.

While excellent results may be obtained from the general construction disclosed, it is to be understood that the present disclosure is principally for illustrative purposes, and that within the scope of the invention as claimed, numerous changes may be made.

We claim:

1. A combined bumper and luggage carrier comprising a pair of parallel longitudinal bars adapted to be secured to the side bars of a chassis, a transverse bar secured to and extending between the outer ends of said longitudinal bars, a bumper bar spaced outwardly from and parallel with said transverse bar, a second pair of parallel longitudinal bars carrying said bumper bar, means slidably mounting said second pair of longitudinal bars on said first named pair of longitudinal bars, and extensible and retractible luggage supporting means between and connected to said transverse bar and said bumper bar.

2. A combined bumper and luggage carrier comprising a pair of parallel longitudinal bars adapted to extend along the side bars of a chassis, the inner ends of said bars being extended inwardly and adapted to be secured to the side bars of the chassis, a transverse bar adapted to extend across the side bars of the chassis and secured at its ends to said longitudinal bars, a second transverse bar extending between and secured to the outer ends of said longitudinal bars, a transverse bumper bar outwardly spaced from said second transverse bar, a second pair of parallel longitudinal bars carrying said bumper bar, means slidably mounting said second pair of longitudinal bars on said first named longitudinal bars, and extensible and retractible luggage supporting means between and supported by said bumper bar and said second transverse bar.

3. A structure as specified in claim 1; the ends of said transverse bar being extended and constituting braces adapted to be secured to fenders of the machine on which the device is used.

In testimony whereof we have hereunto affixed our signatures.

RUDOLF G. SCHULTZ.
OTTO L. HENDREN.